United States Patent Office 2,947,762
Patented Aug. 2, 1960

2,947,762
2-ARALKYL DERIVATIVES OF Δ⁴-PREGNENE-3,20-DIONE AND PROCESS FOR THEIR PRODUCTION

Howard J. Ringold and George Rosenkranz, Mexico City, Mexico, assignors to Syntex S.A., Mexico City, Mexico, a corporation of Mexico No Drawing. Filed Jan. 29, 1957, Ser. No. 636,858
Claims priority, application Mexico Jan. 31, 1956
4 Claims. (Cl. 260—397.3)

The present invention relates to novel cyclopentanophenanthrene derivatives and to a novel process for the production thereof.

More particularly the present invention relates to novel 2-alkyl and aralkyl derivatives of $\Delta^4$-pregnene-3,20-dione which may be further substituted by hydroxy or acyloxy groups at positions C-17 and/or C-21 of the steroid molecule; as in the compounds 2-alkyl or aralkyl - $\Delta^4$ - pregnene - 17$\alpha$ - ol - 3,20 - dione and 17 - esters thereof, 2-alkyl or aralkyl-$\Delta^4$-pregnene-21-ol-3,20-dione and 21-esters thereof, and 2-alkyl or aralkyl-$\Delta^4$-pregnene-17$\alpha$,21-diol-3,20-dione, the 21-esters and the 17$\alpha$, 21-diesters thereof.

The novel 2-alkyl or 2-aralkyl-$\Delta^4$-pregnene-3,20-dione and 2-alkyl or 2-aralkyl-$\Delta^4$-pregnene-17$\alpha$-ol-3,20-dione compounds of the present invention are novel useful hormones having activities of the hormones of the progestational type. The 2-alkyl and aralkyl-$\Delta^4$-pregnene-21-ol-3,20-dione and the 2-alkyl and aralkyl-$\Delta^4$-pregnene-17$\alpha$-21-diol-3,20-dione compounds of the present invention are novel useful hormones having activities of the hormones of the cortical type. In addition all of the novel compounds of the present invention are valuable therapeutics for the inhibition of cardiac fibrilation.

In accordance with the present invention it has been discovered that the 20-monoethyleneketals of $\Delta^4$-pregnene-3,20-dione (progesterone), of $\Delta^4$-pregnene-17$\alpha$-ol-3,20-dione (17-hydroxyprogesterone), of $\Delta^4$-pregnene-17$\alpha$,21-diol-3,20-dione (Reichstein's compound S), of $\Delta^4$ - pregnene - 21 - ol - 3,20 - dione (11 - desoxycorticosterone) upon treatment with ethyl formate in the presence of sodium hydride gives the corresponding 2-hydroxymethylene derivatives. These hydroxymethylene derivatives upon treatment with an alkyl or aralkyl iodide then give the corresponding 2-alkyl or 2-aralkyl-2'-formyl derivatives which when subjected to the action of a mild basic medium such as alkaline activated alumina lose carbon monoxide to give the corresponding 20-ethylene ketal of the desired 2-alkyl or 2-aralkyl compound. The ketal group can then be hydrolysed to the corresponding 20-ketone. The same compounds may also be prepared by treating the 20-ethylene ketal of the 2-alkyl or aralkyl-2'-formyl compound with strong acid in methanol. Conventional esterification of these compounds gave the corresponding esters.

The novel compounds of the present invention may therefore be exemplified by the following formula:

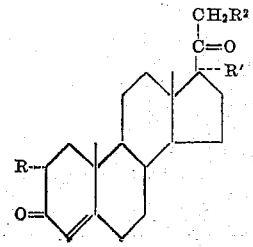

In the above formula R represents an alkyl group, preferably a lower alkyl group such as methyl, ethyl or propyl or R may represent an aralkyl group such as benzyl. R' represents hydrogen, a hydroxy group or an acylate of the type conventionally found in esterified steroid alcohols, these are generally those derived from hydrocarbon carboxylic acids of less than 12 carbon atoms such as acetic, propionic, cyclopentylpropionic, benzoic etc. R² represents the same groups as R'.

The novel compounds of the present invention may be prepared by a process exemplified by the following equation:

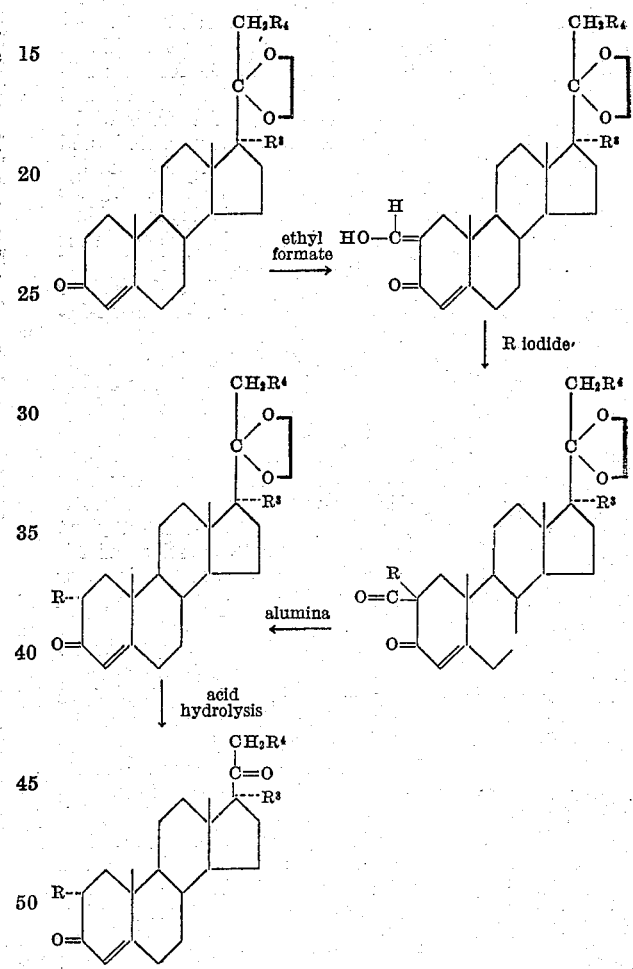

In the above equation R represents the same group as heretofore set forth. R³ and R⁴ represent hydrogen or hydroxy.

The starting materials above designated are either known or may be easily and conventionally obtained from known compounds. Thus the 20-ethylene ketal of progesterone may be obtained from pregnenolone by reaction with ethylene glycol followed by Oppenauer oxidation, the 20-ethylene ketal of 17-hydroxyprogesterone may be obtained by the method of Juian et al. J.A.C.S. 72, 367 (1950), the 20-ethylene ketal of $\Delta^4$-pregnene-17$\alpha$,21-diol-3,20-dione by the method of Antonucci et al., J. Org. Chem., 18, 70 (1950), and the 20-ethylene ketal of $\Delta^4$-pregnene-21-ol-3,20-dione by the method of Von Euw et al. Helv. Chim. Acta. 38, 1423 (1955).

In practicing the process of the invention as outlined above the ketals just referred to are suspended in an inert organic solvent such as anhydrous benzene and mixed with ethyl formate and sodium hydride. The reaction mixture is then stirred for a long period of time (of the order of 3 days) under a nitrogen atmosphere. Upon decomposition of the excess hydride and addition of ice water two layers were formed with the desired hydroxymethylene derivative in the aqueous layer in the form of its sodium salt. After separation of the aqueous layer, acidification and purification the desired corresponding 20-ethylene ketal of the 2-hydroxymethylene derivative was obtained.

The products of the step just described together with sodium hydride were suspended in an inert organic solvent such as benzene and treated with an organic iodide, preferably a lower alkyl or aralkyl iodide such as methyl, ethyl, propyl or benzyl iodide by heating or refluxing for a prolonged period of time (of the order of 24 hours). Preferably the treatment was carried out under an atmosphere of nitrogen and after 24 hours additional iodide was added and refluxing continued for 48 additional hours. Additional iodide was then added and refluxing continued for a total time of the order of 72 hours. The reaction mixture was then cooled and washed with dilute base to remove unreacted starting material. After separation, evaporation of the organic layer and crystallization of the organic layer residue, the products were respectively, the 20-ethylene ketals of the 2-lower alkyl or benzyl-2'-formyl-derivatives of $\Delta^4$-pregnene-3,20-dione, or $\Delta^4$-pregnene-17$\alpha$-ol-3,20-dione or $\Delta^4$-pregnene-17$\alpha$,21-diol-3,20-dione or $\Delta^4$-pregnene-21-ol-3,20-dione.

The 2-lower alkyl or benzyl-2'-formyl derivatives, thus prepared, were then treated with a mild base preferably activated alumina (chromatographic type) of alkaline reaction. This treatment involved passing a benzene solution of the derivatives through a column of the alumina and after about a day's time eluting the product from the column with an organic solvent such as ethyl acetate. The products after crystallization were the 20-ethylene ketals of the 2-lower alkyl or benzyl-derivatives of $\Delta^4$-pregnene-3,20-dione or $\Delta^4$-pregnene-17$\alpha$-ol-3,20-dione, or $\Delta^4$-pregnene-17$\alpha$, 21-diol-3,20-dione or $\Delta^4$-pregnene-21-ol-3,20-dione. The 20-ketal group was then transformed to the 20-keto group with a mineral acid in methanol to give the 2$\alpha$-lower alkyl or benzyl final product.

Instead of the two step removal of CO and hydrolysis of the 20-ketal just described these transformations may be performed in a single step at lower yields by treating the 2-lower alkyl or benzyl-2'-formyl compounds directly with a mineral acid such as sulfuric under reflux conditions for a short period of time.

The 2$\alpha$-lower alkyl or benzyl compounds were converted to esters having ester groupings conventional in the steroid field by known methods of esterification. For producing 21-esters of 2$\alpha$-lower alkyl or benzyl derivatives of $\Delta^4$-pregnene-17$\alpha$, 21-diol-3,20-dione the free alcohols were treated with acid anhydrides in pyridine or with acyl halides. By this means there were prepared the types of esters heretofore set forth i.e. of hydrocarbon carboxylic acids of less than 12 carbon atoms. For the esterification of the 17$\alpha$-hydroxy group of a 2$\alpha$-lower alkyl or benzyl-$\Delta^4$-pregnene-17$\alpha$-ol-3,20-dione the free compound was treated with acylating agents such as acid anhydrides in the presence of an acid such as P-toluenesulphonic acid.

The following specific examples serve to illustrate but are not intended to limit the present invention:

*Example I*

A suspension of 10 g. of the 20-monoethyleneketal of progesterone in 500 cc. of anhydrous benzene free of thiophene was mixed with 10 g. of ethyl formate and 3 g. of sodium hydride and the mixture was stirred for 3 days under an atmosphere of nitrogen. The excess of hydride was decomposed by the cautious addition of 15 cc. of methanol, followed by 300 cc. of ice water. Two layers were formed, of which the aqueous layer contained the hydroxymethylene derivative in the form of its sodium salt. The layers were separated and the aqueous layer was washed with ether and benzene, cooled to a temperature of 5° C. and acidified with an aqueous solution of ammonium chloride. The mixture was extracted with methylene chloride, the solution was evaporated to dryness under vacuum and the residue was crystallized from acetone-hexane, thus giving 8 g. of the 20-ethyleneketal of 2-hydroxymethylene-progesterone.

*Example II*

3 g. of the above compound and 170 mg. of sodium hydride were suspended in 50 cc. of benzene and mixed with 10 cc. of methyl iodide and the mixture was refluxed under an atmosphere of nitrogen. After 24 hours an additional 10 cc. of methyl iodide was added, followed by 10 cc. more after 48 hours, and the refluxing was continued to a total of 72 hours. The cooled mixture was washed with 1% sodium hydroxide solution to remove traces of unreacted starting material and the organic layer was evaporated to dryness under reduced pressure. The residue crystallized from acetone-hexane to give the 20-ethyleneketal of 2-methyl-2'-formyl-$\Delta^4$-pregnene-3,20-dione. This compound showed no color reaction with ferric chloride in aqueous ethanol even after standing for 24 hours.

1 g. of the above compound was dissolved in benzene and the solution was used to impregnate a column with 100 g. of alkaline activated alumina. After 24 hours the column was eluted with ethyl acetate and the combined eluates were crystallized from acetone-hexane to produce the 20-ethylene-ketal of 2$\alpha$-methyl-progesterone.

1 g. of such 20-ethyleneketal was dissolved in 50 cc. of methanol containing 5 cc. of 8 % aqueous sulfuric acid and the mixture was refluxed for 50 minutes, cooled and diluted with water. The methanol was removed by vacuum distillation, the residue was neutralized with sodium bicarbonate and extracted with chloroform. Crystallization afforded 2$\alpha$-methyl-progesterone.

*Example III*

1 g. of the 20-ethyleneketal of 2-methyl-2'-formyl-$\Delta^4$-pregnene-3,20-dione was dissolved in 50 cc. of methanol containing an aqueous solution of 8% sulfuric acid and the mixture was refluxed for 50 minutes. The cooled solution was diluted with water, the methanol was removed by vacuum distillation and the residue was neutralized with sodium bicarbonate and extracted with chloroform. Crystallization yielded 2$\alpha$-methyl-progesterone, identical to the one obtained in accordance with Example II.

*Example IV*

1 g. of the 20-ethyleneketal of 2-hydroxymethylene-progesterone was treated in accordance with the method described in Example II, except that ethyl iodide was used instead of methyl iodide, thus giving 2$\alpha$-ethyl-progesterone.

*Example V*

1 g. of the 20-ethyleneketal of 2-hydroxymethylene-progesterone was treated in accordance with the method described in Example II, except that propyl iodide was used instead of methyl iodide, thus giving 2$\alpha$-propyl-progesterone.

*Example VI*

A mixture of 2.2 g. of the 20-ethyleneketal of 2-hydroxymethylene-progesterone, 170 mg. of sodium hydride, 50 cc. of benzene and 10 cc. of benzyl iodide was refluxed for 72 hours under an atmosphere of nitrogen. The cooled mixture was washed with previously cooled 1% sodium hydroxide solution and evaporated to dryness under reduced pressure. Crystallization from acetone-hexane yielded the 20-ethyleneketal of 2-benzyl-2'-formyl-$\Delta^4$-pregnene-3,20-dione.

The treatment of the latter compound with alkaline activated alumina, followed or combined with a hydrolysis such as has been described in Examples II and III, afforded 2α-benzyl-progesterone.

Example VII 10 g. of the 20-ethyleneketal of 17-hydroxyprogesterone was treated in accordance with the method described in Example II, thus giving 8 g. of the 20-ethyleneketal of 2-hydroxymethylene-17-hydroxyprogesterone.

Example VIII 3 g. of the 20-cycloethyleneketal of 2-hydroxymethylene-17-hydroxyprogesterone was treated in accordance with the method described in Examples II and III, thus producing 2α-methyl-17-hydroxyprogesterone (2α-methyl-Δ⁴-pregnene-17α-ol-3,20-dione). Acetylation with acetic anhydride in the presence of p-toluenesulfonic acid gave the corresponding 17-acetate of 2α-methyl-17-hydroxyprogesterone. By the use of other similar acylating agents other esters were also produced such as the propionate.

Example IX 3 g. of the 20-ethyleneketal of 2-hydroxymethylene-17-hydroxyprogesterone was treated in accordance with the method described in the previous example, using ethyl iodide instead of methyl iodide, thus giving 2α-ethyl-17-hydroxyprogesterone and its 17-esters.

Example X 3 g. of the 20-ethyleneketal of 2-hydroxymethylene-17-hydroxyprogesterone was treated in accordance with the method described in Example VIII using propyl iodide instead of methyl iodide, thus producing 2α-propyl-17-hydroxyprogesterone and its 17-esters.

Example XI

A mixture of 2.2 g. of the 20-ethyleneketal of 2-hydroxymethylene-17-hydroxyprogesterone and 10 cc. of benzyl iodide was treated in accordance with the method described in Example VI, thus giving 2α - benzyl - 17-hydroxyprogesterone and its 17-esters.

Example XII 10 g. of the 20-monoethyleneketal of Reichstein's Compound S was treated in accordance with the method described in Example II, thus yielding 8 g. of the 20-ethyleneketal of 2 - hydroxymethylene - Δ⁴-pregnene-17α,21-diol-3,20-dione.

3 g. of this compound was treated in accordance with the method described in Examples II and/or III, thus giving 2α-methyl-Δ⁴-pregnene-17α,21-diol-3,20-dione, from which we also prepared its 21-acetate by routine acetylation with acetic anhydride in pyridine solution. Other esters of hydrocarbon carboxylic esters of less than 12 carbon atoms such as the propionate, cyclopentyl propionate and benzoate were similarly prepared by conventional reaction with acid anhydrides and/or chlorides. The corresponding 2α-ethyl, propyl, and benzyl derivatives were also similarly prepared.

Example XIII 10 g. of the 20-monoethyleneketal of desoxycorticosterone was treated in accordance with the method described in Example II, thus giving 8 g. of the 20-ethyleneketal of 2-hydroxymethylenedesoxycorticosterone.

3 g. of this compound was treated in accordance with the method described in Examples II and/or III, thus producing 2α-methyldesoxycorticosterone, from which the 21-acetate was also prepared by routine acetylation with acetic anhydride in pyridine solution. Other 21-esters such as those described in Example XII were similarly prepared. The corresponding 2α-ethyl, propyl, and benzyl derivatives were also similarly prepared.

We claim:
1. 2α-benzyl-Δ⁴-pregnene-3,20-dione.
2. 2α-benzyl-Δ⁴-pregnene-17α-ol-3,20-dione.
3. 2α-benzyl-Δ⁴-pregnene-21-ol-3,20-dione.
4. 2α-benzyl-Δ⁴-pregnene-17α,21-diol-3,20-dione.

References Cited in the file of this patent

Fieser et al.; Natural Products Related to Phenanthrene, 3rd. ed., pp. 301, 435 (1949).

"Chemical Abstracts," vol. 49 (1955), pars. 512 (i) Junkman et al.

Hogg: J.A.C.S., 77, pages 6401–6402, Dec. 5, 1955.